United States Patent [19]

Tomar

[11] Patent Number: 4,498,667
[45] Date of Patent: * Feb. 12, 1985

[54] PROCESS FOR COATING BALL CORES

[75] Inventor: Julius Tomar, Port-au-Prince, Haiti

[73] Assignee: Home of Champions, S.A., Port-au-Prince, Haiti

[*] Notice: The portion of the term of this patent subsequent to Jul. 8, 1997 has been disclaimed.

[21] Appl. No.: 29,295

[22] Filed: Apr. 12, 1979

Related U.S. Application Data

[60] Continuation-in-part of Ser. No. 943,145, Sep. 18, 1978, Pat. No. 4,211,407, which is a division of Ser. No. 858,415, Dec. 17, 1977, Pat. No. 4,144,297.

[30] Foreign Application Priority Data

Dec. 28, 1976 [HT] Haiti ............................................. 139

[51] Int. Cl.$^3$ ................................................. A63B 37/06
[52] U.S. Cl. .......................... 273/60 B; 273/DIG. 4; 273/DIG. 5; 273/DIG. 11; 273/60 A
[58] Field of Search .................. 273/60 B, 60 R, 60 A

[56] References Cited

U.S. PATENT DOCUMENTS

| | | | |
|---|---|---|---|
| 2,743,931 | 5/1956 | Pooley et al. | 273/60 B |
| 2,753,599 | 7/1956 | Pietraszek et al. | 273/60 B X |
| 2,938,237 | 5/1960 | Kern et al. | 273/60 B |
| 3,069,170 | 12/1962 | Dillon | 273/60 B X |
| 4,144,297 | 3/1979 | Tomar | 264/51 X |
| 4,211,407 | 7/1980 | Tomar | 273/60 B |

Primary Examiner—Alexander S. Thomas
Attorney, Agent, or Firm—Webb, Burden, Robinson & Webb

[57] ABSTRACT

A process for forming a rubber or vinyl coated baseball or softball is comprised of supporting a baseball or softball core within a mold cavity to position the exterior of the core uniformly equidistant from the mold cavity wall to provide a space between the core exterior and the cavity wall. A thermoplastic rubber or plasticized vinyl resin is injected into the mold cavity to flow into and fill the space between the core and the wall. The thermoplastic rubber or plasticized vinyl resin is allowed to solidify and a rubber or vinyl coated baseball or softball is removed from the mold. Z 2 Claims, 4 Drawing Figures

PROCESS FOR COATING BALL CORES

CROSS REFERENCE TO RELATED APPLICATIONS

This application is a continuation-in-part of application Ser. No. 943,145, filed Sep. 18, 1978, now U.S. Pat. No. 4,211,407, which is a division of application Ser. No. 858,415, filed Dec. 17, 1977, now U.S. Pat. No. 4,144,297.

BACKGROUND OF THE INVENTION

1. Field of the Invention

This invention relates to baseballs and softballs and more particularly to rubber and vinyl coated baseballs and softballs.

2. Description of the Prior Art

Baseballs, as are used in the United States, have been predominantly constructed of a cork or a rubber core wound with wool yarn and cotton thread, and covered with a two piece leather cover. Where the balls are used for practice, the cover is constructed of a thermosetting rubber to impart durability to the practice baseball.

In another aspect, baseball cores have been constructed of thermoplastic resins having foam decreasing in cell size radially outwardly to a skin. These cores and the method of making them are more fully disclosed in U.S. Pat. No. 4,144,297 entitled "Method of Injection Molding a Foamed Thermoplastic Resin Ball Core Having an Integral Skin" of Julius Tomar issued Mar. 13, 1979 and incorporated herein by reference.

Analogously, softballs have been made from predominantly a cork or kapok core wound with a synthetic yarn or thread, with a cover formed upon the surface of the softball much the same as the baseball. The aforementioned patent teaches a method of forming thermoplastic softball cores in the same manner as the baseball cores.

In the prior art method of rubber coating baseballs and softballs, the ball core is dipped in a thermosetting latex to partially impregnate the baseball or softball core and the latex is dried and cured in a mold to form the rubber coated baseball or softball. This method is time consuming and requires a drying and curing step.

In accordance with the present invention, a method of forming a rubber coated baseball or softball is provided which is efficient and provides a baseball or softball which has the requisite durability for repeated playing in a practice atmosphere. Further, a process of forming a vinyl coated baseball or softball is provided.

BRIEF DESCRIPTION OF THE INVENTION

A process for forming a rubber or vinyl coated baseball or softball is comprised of supporting a baseball or softball core within a mold cavity to position the exterior of the core uniformly equidistant from the mold cavity wall to provide a space between the core exterior and the cavity wall. A thermoplastic rubber or plasticized vinyl resin is injected into the mold cavity to flow into and fill the space between the core and the wall. The thermoplastic rubber or plasticized vinyl resin in allowed to solidify and a rubber or vinyl coated baseball or softball is removed from the mold.

DETAILED DESCRIPTION OF THE INVENTION

"Rubber" as used herein means and refers to elastomers as is defined by the ASTM definition: "a material which at room temperature can be stretched repeatedly to at least twice its original length and, upon release of the stress, will return immediately with force to its approximate original length." The rubbers useful in the practice of the invention are thermoplastic in that they are capable of repeated heating beyond their softening or flow point.

"Plasticized vinyl resin" as used herein means and includes polyvinyl chloride polymers compounded with plasticizers and polyvinyl chloride acetate polymers compounded with plasticizers having flexibility equivalent to the thermoplastic rubbers useful in the practice of the invention.

Typically the thermoplastic rubbers are, but not limited to, hydrocarbon block copolymerized resins and polyester resins. Exemplary of the block hydrocarbon copolymers are block copolymers of blocks of polystyrene and polybutadiene, or blocks of polystyrene and polyisoprene sold under the trademark Kraton by Shell Development Co. and the trademark Polyfleet sold by Polyfleet Ltd.; radial block copolymers sold under the tradename Solprene by Phillips Petroleum Co. Exemplary of the copolyester resins are polyesters of terephthalic acid; polytetramethylene ether glycol; and 1,4-butanediol sold under the trademark Hytrel by E. I. du Pont de Nemours & Co., Inc.

The baseball or softball cores useful in the practice of the invention are of virtually any known construction. However, the preferred baseball cores are those disclosed in U.S. Pat. No. 4,144,297 previously discussed, which are constructed of an ethylene-vinyl acetate copolymer. These thermoplastic ball cores are formed of a thermoplastic resin and preferably an ethylene-vinyl acetate copolymer having 12% to 30% by weight polymerized vinyl acetate units therein and a blowing agent which provides a ball core characterized by having foam in the core center gradually reducing in cell size radially outwardly to a skin having a density substantially equal to the density of the copolymer.

The preformed ball core is positioned in a spherical mold cavity so that the exterior of the core is uniformly equidistant from the mold cavity wall to provide a space between the core exterior and the mold cavity wall. The equidistant spacing is provided by means of small pins extending from the mold cavity wall of the same length as the radius of the space between the core and the cavity wall. The pins are of a sufficient number to prevent movement of the ball core in any direction.

The mold is positioned at the injection station and the thermoplastic rubber or plasticized vinyl resin is injected into the mold under heat and pressure in a conventional injection molding process.

Preferably, the mold is water cooled to minimize processing time and prevent the molten thermoplastic rubber or plasticized vinyl resin from substantially penetrating the thermoplastic ball core and causing nonuniformity of the ball core and the rubber cover.

After the thermoplastic rubber cools and is dimensionally stable, the coated core is removed from the mold as a rubber or vinyl coated baseball or softball.

The invention is illustrated by the following drawings.

DETAILED DESCRIPTION OF THE DRAWINGS

Figure 1:
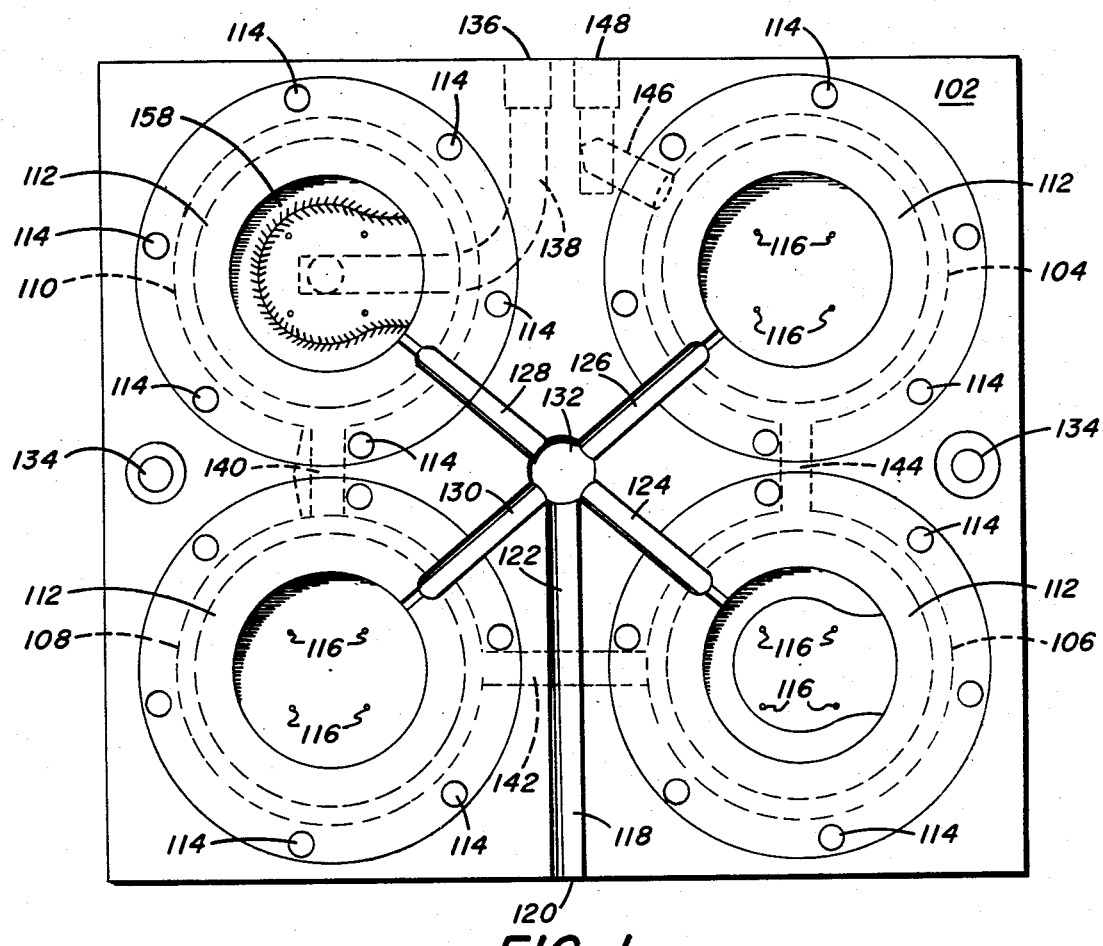
FIG. 1 is a top plan view partially in phantom of one half of a mold useful in the practice of the invention.
Figure 2:
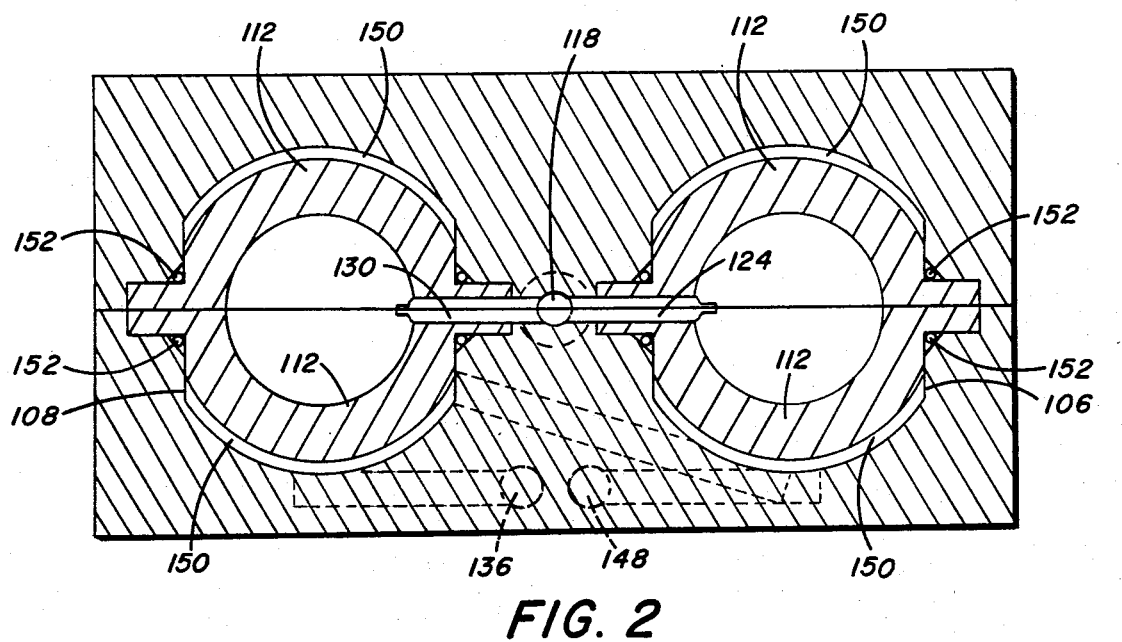
FIG. 2 is a front sectional view of a mold useful in the practice of the invention.
Figure 3:
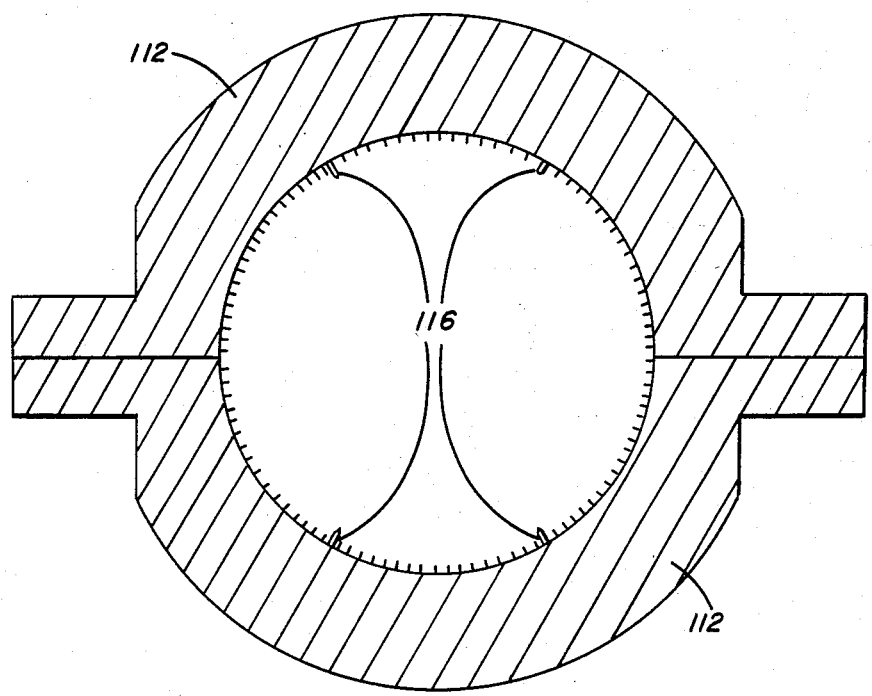
FIG. 3 is a front cross-sectional view of two mated mold insert halves useful in the practice of the invention.

Referring now to the drawings wherein like reference numerals refer to like parts, FIGS. 1-3 illustrate a mold and portions thereof useful in the practice of the present invention. In FIG. 1 a mold half 102 is shown which has an identical half to provide a mold useful for forming rubber or vinyl coated baseballs. The mold is provided with four insert mounts 104, 106, 108 and 110, all of identical configuration. Within the mold insert mounts are mold inserts 112 which are mounted by insert screws or pins 114. Each of the mold inserts 112 are provided with four pins 116 which are useful to support a ball core 118 in equidistant spaced relationship from the interior wall of the mold inserts 112.

A mold runner system, generally designated by the numeral 118, has an inlet 120, a primary channel 122, secondary channels 124, 126, 128 and 130 with an intersecting junction 132. The mold runner system is provided to feed molten thermoplastic material from an injection molding machine into the mold cavities within the mold 102. Location dowels 134 are provided so that the mating halves of the two molds can be accurately mounted to each other to form true spherical coated balls.

Preferably, the mold is water cooled at a temperature of between about 35° F. and 65° F. by having the water flow through inlet 136, through channel 138 around cavity 110, through channel 140 around cavity 108, through channel 142 around cavity 106, from cavity 106 through channel 144 around cavity 104, from cavity 104 through channel 146 and from the outlet 148. The water flows between the mold mounting wall and the wall exterior of the insert through a space 150 which surrounds the mold insert. Sealing rings 152 are provided between the mold insert and the mold mounting wall to provide a water tight seal and prevent leakage of the cooling water into the interior space defined by the insert.

In FIG. 1 a rubber or vinyl coated baseball 156 is shown within the mold. It is to be noted that the mold cavities are engraved to provide a stitched pattern to the thermoplastic rubber.

In operation a ball core preferably constructed of an ethylene-vinyl acetate copolymer having 12% to 30% polymerized vinyl acetate units therein and characterized by a foam center reducing in cell size radially outwardly from the center of the core, is placed on the pins 116 of one mating half of the mold. Three other such cores are also placed within the mold and the mating half of the mold having an identical configuration is aligned on the dowel pins 134 and the two halves are clamped together, and placed at an injection molding station.

A conventional injection molding machine (not shown in the drawings) is charged in the hopper of the injection molding machine with a thermoplastic rubber exemplary of which is Polyfleet Grade TR 121 or a plasticized vinyl resin. Polyfleet Grade TR 121 is a compound formulation containing a block copolymer of polystyrene and polybutadiene blended with additional amounts of polystyrene and naphthenic process oil. The TR 121 has a hardness IRHD of 60, specific gravity of 1.00 and a melt index of 25 dg/min (E). As is in most injection molding processes, there are three zones within the injection molding machine which process the thermoplastic material. The first zone is the feed zone and in this process is generally regulated between 150° C. to 160° C. The second zone or the mixing zone is maintained at about 160° C. to 170° C. and the metering zone is regulated at a temperature between 180° C. and 190° C., thus providing a fluid thermoplastic rubber having an injection temperature of 180° C. to 190° C.

A typical plasticized vinyl resin which can be injection molded is prepared according to the following formulation:

| Ingredient | Part by Weight |
| --- | --- |
| Polyvinyl chloride polymer (K = 681) | 100 |
| Dioctyl phthalate | 50–70 |
| Adipate plasticizer | 5 |
| Elvaloy 741 (polyvinyl chloride modifier manufactured by E. I. du Pont de Nemours Co.) | 40–60 |
| Cacoz | 15 |
| Stearic acid | 0.5 |
| Epoxidized soybean oil | 5.0 |
| Stabilizer | 2.5 |
| Phosphite chelator | 0.5 |

The nozzle of the injection molding machine is mated with the inlet 120 of the mold runner system and a premeasured quantity of thermoplastic rubber or plasticized vinyl resin is injected into the inlet and flows along channel 122 to junction 132 and through the four channels 124, 126, 128 and 130 into the respective cavities and the spaces defined by the interior walls of the mold inserts and the exterior of the ball cores. The fluid thermoplastic rubber or plasticized vinyl resin flows between the ball cores and the interior walls of the mold inserts to form a coating on the ball cores of thermoplastic rubber or plasticized vinyl resin of a uniform thickness generally equal to the thickness of the pins. After injection, the mold is removed from the injection station and allowed to cool for 0.5 to 5 minutes, and more preferably, 0.5 to 2 minutes, until the thermoplastic rubber or plasticized vinyl resin is solidified. The mating halves of the mold are separated and a ball having a thermoplastic rubber or plasticized vinyl resin cover thereon is removed from the mold.

The thermoplastic rubber or plasticized vinyl resin retained in the mold runner system is separated from the surface of the coated balls and can again be fed into the hopper of the injection molding machine for recycling.

In the case of rubber or plasticized vinyl resin coated baseballs the cores are produced to a size of 8 inches circumference and the interior circumference defined by the interior of the mold inserts is 9 inches in circumference. The ¾ inch difference between the circumference of the interior circumference of the mold and the circumference of the ball provides a radial difference of 0.20 inches which is necessary to allow the viscous thermoplastic rubber or plasticized vinyl resin to flow in the space defined by the interior of the mold inserts and the exterior of the core while compensating for the cooling effect provided. A radial difference of 0.10 or less is inadequate to allow the thermoplastic rubber or plasticized vinyl resin to flow in the space between the interior of the mold insert and the ball core.

Figure 4:
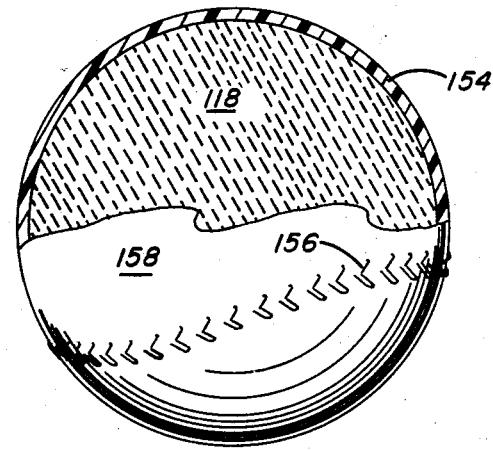
FIG. 4 is a front view partially in section of a ball manufactured in accordance with the invention.

It is necessary to cool the mold, otherwise the hot thermoplastic rubber or plasticized vinyl resin would tend to deform the ball cores, since they too are thermoplastic and heat deformable, and provide an irregular product. Further, it is desirable to cool the mold so that reasonable mold cycle times may be achieved. FIG. 4 illustrates a ball produced in accordance with the invention. The thermoplastic core 118 is coated with the thermoplastic rubber or plasticized vinyl resin 154 having a thickness equal to the pin length 116.

Preferably the mold is provided with a stitch pattern 156 engraved in each mold insert to give the appearance of a baseball or softball.

Although the invention has been described with reference to specific materials and specific processing the invention is only to be limited so far as is set forth in the accompanying claims.

I claim:

1. A coated ball selected from the group consisting of a baseball and a softball having substantially the same weight and rebound characteristics as a conventional baseball or softball comprising a thermoplastic core with foam at the center thereof gradually reducing in cell size radially outwardly to a skin, and a coating selected from the group consisting of thermoplastic rubber or plasticized vinyl resin, said thermoplastic core being an ethylene-vinyl acetate copolymer having 12 to 30 percent by weight polymerized vinyl acetate units therein.

2. The ball of claim 1 which is a baseball.

* * * * *